US008655085B2

(12) United States Patent
Khawand et al.

(10) Patent No.: US 8,655,085 B2
(45) Date of Patent: Feb. 18, 2014

(54) BURST MODE IMAGE COMPRESSION AND DECOMPRESSION

(75) Inventors: Charbel Khawand, Sammamish, WA (US); Peter Mikolajczyk, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 534 days.

(21) Appl. No.: 12/914,898

(22) Filed: Oct. 28, 2010

(65) Prior Publication Data

US 2012/0106852 A1      May 3, 2012

(51) Int. Cl.
*G06K 9/34*   (2006.01)
(52) U.S. Cl.
USPC ............................ 382/233; 382/236; 382/248
(58) Field of Classification Search
USPC ......................... 382/232, 236, 248, 251, 233; 348/400.1, 403.1; 375/240, 240.18
See application file for complete search history.

(56) References Cited

U.S. PATENT DOCUMENTS

| | | | |
|---|---|---|---|
| 6,011,901 A | 1/2000 | Kirsten | |
| 6,933,970 B2 | 8/2005 | Koshiba | |
| 7,088,396 B2 | 8/2006 | Fredlund | |
| 7,319,480 B2 | 1/2008 | Akiyama | |
| 2003/0222998 A1* | 12/2003 | Yamauchi et al. | 348/262 |
| 2005/0262543 A1 | 11/2005 | Wu | |
| 2006/0023100 A1 | 2/2006 | Chosa | |
| 2007/0074265 A1* | 3/2007 | Bennett et al. | 725/135 |
| 2008/0024632 A1* | 1/2008 | Otsuka | 348/294 |
| 2008/0089616 A1* | 4/2008 | Gwak | 382/309 |
| 2008/0143840 A1 | 6/2008 | Corkum | |
| 2009/0024619 A1* | 1/2009 | Dallmeier et al. | 707/5 |
| 2009/0290037 A1 | 11/2009 | Pore | |

FOREIGN PATENT DOCUMENTS

| | | |
|---|---|---|
| CN | 1735137 A | 2/2006 |
| CN | 1973529 A | 5/2007 |

OTHER PUBLICATIONS

Camera and Imaging Products Association, "Exchangeable image file format for digital still cameras: Exif Version 2.3," JEITA CP-345113/CIPA DC-008-2010, 190 pages, Published Date: Apr. 26, 2010.
"Exif Tags," http://owl.phy.queensu.ca/~phil/exiftool/TagNames/EXIF.html, 22 pages, Published Date: Oct. 6, 2010, Retrieved Date: Oct. 14, 2010.

(Continued)

*Primary Examiner* — Jon Chang
(74) *Attorney, Agent, or Firm* — Aaron Chatterjee; Andrew Sanders; Micky Minhas

(57) ABSTRACT

Modified compression/decompression and metadata in burst mode images reduce the storage space consumed by burst mode images. Metadata is added to image files (e.g., EXIF files) to establish links between images in a burst mode image series. A series of linked burst mode images can include delta images representing a temporal difference between the image data (e.g., pixel data) for two burst images captured at different time instances. Difference information can be compressed. A root image for a linked burst mode series can be identified and used as a reference for other burst images. Metadata can be added to image files to link burst images prior to compression, after compression, or at an intermediate stage of compression of image data. Difference information for delta image files can be derived prior to compression, after compression, or at an intermediate stage of compression of image data.

38 Claims, 13 Drawing Sheets

(56) References Cited

OTHER PUBLICATIONS

"ExifTool Ancient History," http://owl.phy.queensu.ca/~phil/exiftool/ancient_history.html, 76 pages, Published Date: Nov. 19, 2003-Jan. 29, 2010, Retrieved Date: Oct. 28, 2010.

"ExifTool by Phil Harvey," http://owl.phy.queensu.ca/~phil/exiftool/, 17 pages, Published Date: Oct. 7, 2010, Retrieved Date: Oct. 14, 2010.

"ExifTool Version History," http://owl.phy.queensu.ca/~phil/exiftool/history.html, 8 pages, Published Date: Feb. 8, 2010-Oct. 23, 2010, Retrieved Date: Oct. 28, 2010.

Japan Electronics and Information Technology Industries Association, "Exchangeable image file format for digital still cameras: Exif Version 2.2," JEITA CP-3451, 154 pages, Published Date: Apr. 2002.

Kirn, "Multi Burst Sony Digicam Images: Free Processing Coding to the Rescue," http://createdigitalmotion.com/2007/05/multi-burst-sony-digicam-images-free-processing-coding-to-the-rescue/, 8 pages, Published Date: May 2007, Retrieved Date: Oct. 14, 2010.

Malektips.com, "JPG File Format—File extensions," http://malektips.com/file-extensions-jpg-jpeg-image-photo.html, 4 pages, Published Date: Sep. 2009, Retrieved Date: Jul. 20, 2010.

Olympus Imaging America, Inc., "Choosing the right record mode," http://www.olympusamerica.com/crm/oneoffpages/crm_e_record.asp?cm=EVOLT+E-510, 5 pages, Retrieved Date: Jul. 20, 2010.

"Sony Tags," http://owl.phy.queensu.ca/~phil/exiftool/TagNames/Sony.html, 19 pages, Published Date: Sep. 16, 2010, Retrieved Date: Oct. 14, 2010.

Notice on the First Office Action from Chinese Patent Application No. 201110355945.1, dated Dec. 4, 2013, 11 pages. (English translation).

\* cited by examiner

Figure 7

```
<CONST_GUID> <GUID_OF_ROOT_IMAGE> 0, 1
<START_INDEX> <END_INDEX>
<END_OF_SEQ>
```
— 710

```
<CONST_GUID> <GUID_OF_ROOT_IMAGE> N, 0
<END_OF_SEQ>
```
— 720

```
<CONST_GUID> <GUID_OF_ROOT_IMAGE> 0, 1
<START_INDEX> <END_INDEX>
<EMBEDDED_INDEX> <SIZE_EMBEDDED> <EMBEDDED_DATA>
<END_OF_SEQ>
```
— 730

Software 1180 implementing described technology

BURST MODE IMAGE COMPRESSION AND DECOMPRESSION

BACKGROUND

Burst mode is a feature of many digital cameras that can be used to capture (e.g., with a single button-push) a series of still images over a short period of time. Burst mode can be used, for example, to capture subtle variations in a mostly static scene, such as changes in light reflected on rippling water in a landscape, or to capture motion in a highly dynamic scene, such as an action shot of a football game. In a typical burst mode, the ability to capture a series of several images with a single button-push comes at the cost of a higher burden on storage capacity, which caused by the multiplier effect of burst images. For example, in a burst mode that captures a series of five images per button-push, a user that takes ten burst mode shots of a scene will actually generate 50 full-size images. Such burst mode shots will consume storage capacity at five times the rate of shots taken in a mode where each shot generates a single image.

SUMMARY

Techniques and tools for compressing, decompressing and displaying burst mode images are described.

Technology described herein involves modified compression/decompression and the use of metadata in burst mode images to reduce the amount of data consumed by burst mode images, among other potential benefits. For example, metadata (e.g., image metadata linker fields) is added to image files (e.g., EXIF files) to establish relationships, or links, between images in a burst mode image series. A series of linked burst mode images can include delta images. In examples described herein, a delta image represents a temporal difference between the image data (e.g., pixel data) for two burst images captured at different time instances in a burst series. For example, a first delta image can represent a difference between a first burst image and a second burst image that follows immediately in the series. In examples described herein, a root image for a linked burst mode series is identified (e.g., with a globally unique identifier (GUID)) in image metadata. The identification of the root image for a particular linked burst mode series helps to distinguish that series from another series with a different root image.

Metadata can be added to image files to link burst images prior to compression, after compression, or at an intermediate stage of compression of image data. Metadata can be stored in a data structure with an image format identifier field comprising an identifier of a linked burst mode image format, a root image identifier field comprising an identifier of a root image for the burst mode image series, and an image index field comprising an index value representing an index of a given image in the burst mode image series. Other metadata also can be added to image files, such as a full image field comprising a bit that indicates whether the given image is a full image or a delta image, a start index field comprising a start index value representing a starting index for the burst mode image series, and an end index field comprising an end index value representing an ending index for the burst mode image series.

The difference information for delta image files also can be derived prior to compression, after compression, or at an intermediate stage of compression of image data. Difference information also can be compressed. In particular, linked burst mode images can reduce demand on storage resources because delta images typically consume less storage than full images. For example, difference information for a delta image is calculated, compressed and stored. Such a delta image can be reconstructed by decompressing the difference information and combining the difference information with image data from a root image file. The difference information, linking metadata, and image data for a root image and delta image typically use less storage space than image data for two burst images, so the total size of the two burst images can be significantly reduced. Overall saving of storage space can be even greater for subsequent delta images.

Described technologies can provide other benefits, as well. For example, in a user interface that provides a library view of image files on a device, a series of linked burst mode images can be represented in the user interface by a single root image (or a thumbnail version of a single root image) while other images in the burst series remain hidden, leaving more screen area for stand-alone images, images for different burst series, or other information. A user can access delta images linked to the root image by interacting with (e.g., via a gesture on a touchscreen) the root image. For example, tapping a thumbnail version of a root image can cause thumbnail versions of delta images linked to the root image to be displayed, or can cause display of consecutive reconstructed images in a burst series.

The foregoing and other objects, features, and advantages of the invention will become more apparent from the following detailed description, which proceeds with reference to the accompanying figures.

BRIEF DESCRIPTION OF THE DRAWINGS

FIG. 7 is a diagram showing exemplary image metadata linker field layouts.

DETAILED DESCRIPTION

Techniques and tools for compressing, decompressing and displaying burst mode images are described.

The various examples described herein can be used in combination or independently. Technology described herein can be used in a computer system with software, hardware, or a combination of software and hardware for processing digital still images, or in some other system not specifically limited to processing digital still images.

I. Digital Imaging—Overview

A. Exemplary Digital Imaging Workflow

Figure 1:
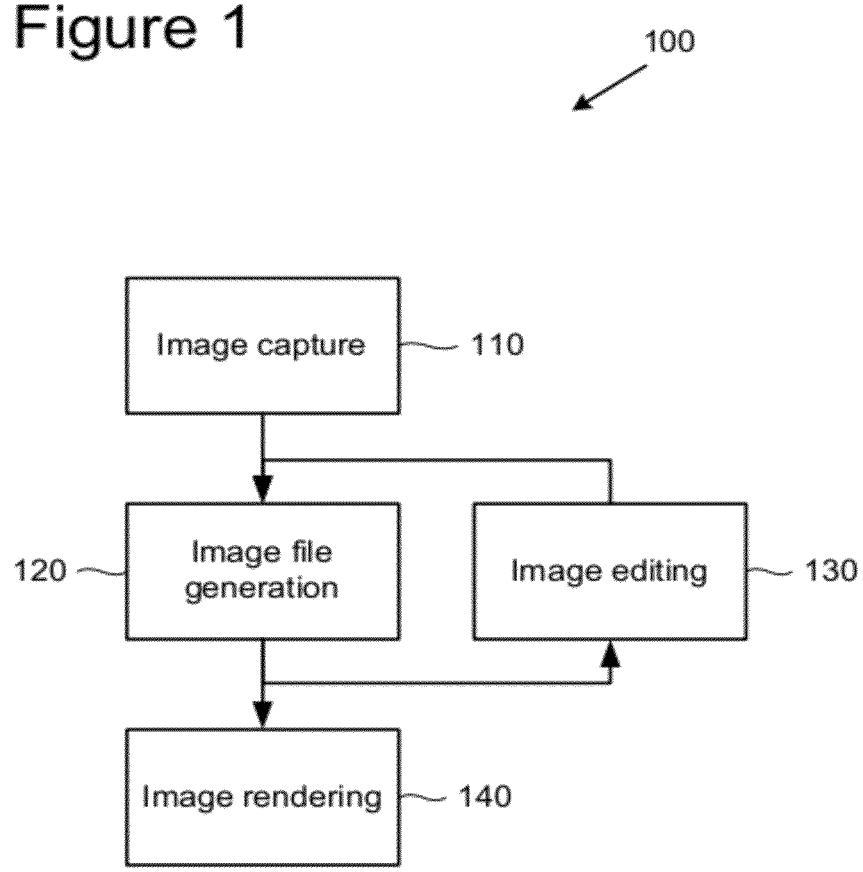
FIG. 1 is a flowchart of an exemplary digital image processing workflow.

As shown in FIG. 1, an exemplary digital imaging workflow 100 includes image capture 110, image file generation 120, image editing 130, and image rendering 140. In image capture 110, one or more images are captured by an image capture device (e.g., a digital camera, a smartphone with digital camera functionality, etc.). In image file generation 120, a captured image is saved in an image file. For example image data (e.g., pixel data) is stored in a file in a compressed or uncompressed format, potentially along with other information, such as image metadata. In image editing 130, an image can be edited. For example, an image editor can take an image file as input and perform editing functions on image data in the image file. The edited version of the file can be saved by overwriting the old version of the file, or by saving the edited version as a new file. In image rendering 140, image information is converted into another form for display. For example, an image that has been captured and then compressed according to the JPEG image compression format can be decompressed and rendered for display.

Although the exemplary workflow 100 shows image capture 110 followed by image file generation 120 and image rendering 140, a digital imaging system can capture images without rendering them, such as when images are generated for storage or for further processing, but are not displayed. A digital imaging system also can render images without capturing images or generating image files, such as when a device running an image editing application obtains pre-existing image files (e.g., via a communication medium) from another source. Different stages in the digital imaging workflow 100 can be performed by different devices or software applications.

In general, digital images described herein can be captured by any device capable of capturing digital images (e.g., digital still image cameras, digital video cameras, scanners, or multipurpose devices with image capture capability such as camera phones) and can be stored on any medium capable of storing digital images (e.g., volatile memory or nonvolatile memory such as optical disks or flash memory).

B. Exemplary File Formats

Digital images described herein can be color, grey-scale, or other types of images, and can be represented in a variety of file formats (e.g., GIF, PNG, BMP, TIFF, TIFF Float32, JPEG, JPEG XR, and/or other formats) for raw, uncompressed image data or compressed image data. For example, described techniques and tools can handle standard dynamic range (SDR) images in an SDR format such as JPEG, or high dynamic range (HDR) images in a high dynamic range format.

Some image formats are specified by international standards. For example, the JPEG standard sets forth requirements for decoders to decode images encoded in JPEG format. A JPEG-compliant encoder and decoder ("codec") can typically provide high-quality images with good compression efficiency.

The Exchangeable Image File ("EXIF") format specifies a structure for image files. Image data in an EXIF file can be compressed (e.g., in JPEG format). Alternatively, image data in an EXIF file can be uncompressed (e.g., in TIFF format). Devices and software that write EXIF files can be referred to as EXIF writers. Devices and software that edit, delete or add new data to EXIF files can be referred to as EXIF editors. Devices and software that read EXIF files can be referred to as EXIF readers. Burst mode image compression technology described herein can be implemented in conjunction with EXIF writers, EXIF editors, EXIF readers, or some other tool.

The term "tag" refers to a data field that can be used by an EXIF writer to record ancillary data about an image in an EXIF file. Such ancillary data about an image can be referred to as metadata. Metadata is distinguishable from the image data (e.g., pixel values) that define the image itself. As described herein, metadata can be used in combination with image data to perform different types of image processing, such as burst mode image compression.

Many EXIF tags are associated with particular image attributes such as shutter speed, focal length, and the like. Other tags are not associated with particular image attributes and can be used to add a greater variety of metadata to EXIF files. For example, MakerNote is a tag name given to a manufacturer tag, which can be used by device manufacturers to add proprietary information, or for other purposes. Tags typically are identified by a tag name and a numeric value. For example, in one version of the EXIF standard MakerNote has a corresponding numeric tag ID of 37500. More information on EXIF can be found in "Exchangeable image file format for digital still cameras: Exif Version 2.3," established by the Camera and Imaging Products Association on Apr. 26, 2010.

II. Burst Mode Image Compression

Burst mode is a feature of many digital cameras that can be used to capture (e.g., with a single button-push) a series of still images over a short period of time.

In a typical burst mode, the ability to capture a series of several images with a single button-push comes at the cost of a higher burden on system resources (e.g., storage capacity), which is caused by the multiplier effect of burst images. As capture of higher resolution images (e.g., 5 megapixel images, 8 megapixel images, etc.) becomes commonplace, the multiplier effect of burst mode images on storage capacity can have greater effect. Moreover, such consumption of storage capacity can be repeated at different locations. For example, local storage (e.g., a memory card, flash memory, etc.) on a device such as a smartphone with digital camera functionality can be consumed. Later, remote storage capacity can be consumed, such as when locally captured images are uploaded to remote servers (e.g., in a cloud computing arrangement), synchronized to personal computers, and the like.

Technology described herein involves modified compression/decompression and the use of metadata in burst mode images to reduce the amount of data consumed by burst mode images, among other potential benefits. A series of images captured in burst mode over a short period of time can be referred to as a burst mode image series, or burst series. Typically, each image in a burst mode image series is captured at a different time instance, which can be indicated by a time stamp associated with the image.

Adding or editing metadata to image files to establish relationships between images in a burst mode image series can be referred to as linking the burst mode images. Burst mode images corresponding to image files that have had such metadata added can be referred to as linked burst mode images.

A series of linked burst mode images can include delta images. In examples described herein, a delta image represents a temporal difference between the image data (e.g., pixel data) for two burst images captured at different time instances in a burst series. For example, a first delta image can represent a difference between a first burst image and a second burst image that follows immediately in the series. Alternatively, a delta image can represent a difference between burst images that are not consecutive.

A series of linked burst mode images can include full images. In contrast to a delta image, a full image does not represent a difference between two burst images. One example of a full image is a root image. In examples described herein, a root image for a linked burst mode series is identified (e.g., with a globally unique identifier (GUID)) in image metadata. The identification of the root image for a particular linked burst mode series helps to distinguish that series from another series with a different root image. In examples described herein, a linked burst mode series has a single root image and may include one or more other full images and one or more delta images. Another example of a full image is an image in a burst mode series for which a difference relative to another image exceeds a threshold. Alternatively, a linked burst mode series can have more than one root image or no root images (e.g., where linking metadata does not identify a root image but instead links the images in the burst mode series in some other way, such as with a unique identifier for the series as a whole).

Linked burst mode images can reduce demand on storage resources because delta images typically consume less storage than full images. For example, difference information for a delta image is calculated, compressed and stored. Such a delta image can be reconstructed by decompressing the difference information and combining the difference information with image data from a root image file. The difference information, linking metadata, and image data typically use less storage space than image data for two burst images, so the total size of the two burst images can be significantly reduced.

Described technologies can provide other benefits, as well. For example, in a user interface that provides a library view of image files on a device, a series of linked burst mode images can be represented in the user interface by a root image (or a thumbnail version of a root image) while other images in the burst series remain hidden, leaving more screen area for stand-alone images, images for different burst series, or other information. A user can access delta images linked to the root image by interacting with (e.g., via a gesture on a touchscreen) the root image. For example, tapping a thumbnail version of a root image can cause thumbnail versions of delta images linked to the root image to be displayed, or can cause display of consecutive reconstructed images in a burst series.

Image data in a full image file (e.g., a root image file) can be compressed (e.g., according to a standardized compression format such as JPEG). Such compression can occur immediately after image capture or at some other time. For example, image data can be captured and then compressed when it is stored in a root image file for the first time. As another example, image data can be captured and stored in an uncompressed image file, and the uncompressed image file can be compressed later according to a compression format such as JPEG. Metadata can be added to image files to link burst images prior to compression, after compression, or at an intermediate stage of compression (e.g., between compression stages).

Difference information for delta image files can be derived prior to compression, after compression, or at an intermediate stage of compression (e.g., between compression stages). For example, during a compression process for a root image comprising a forward frequency transform, quantization, and entropy coding, a difference between the root image and a non-root image is calculated after quantization of the root image data and the non-root image data, but before entropy coding. Difference information also can be compressed (e.g., using entropy encoding or another compression scheme).

A. Generalized Linked Burst Mode Image System

Figure 2:
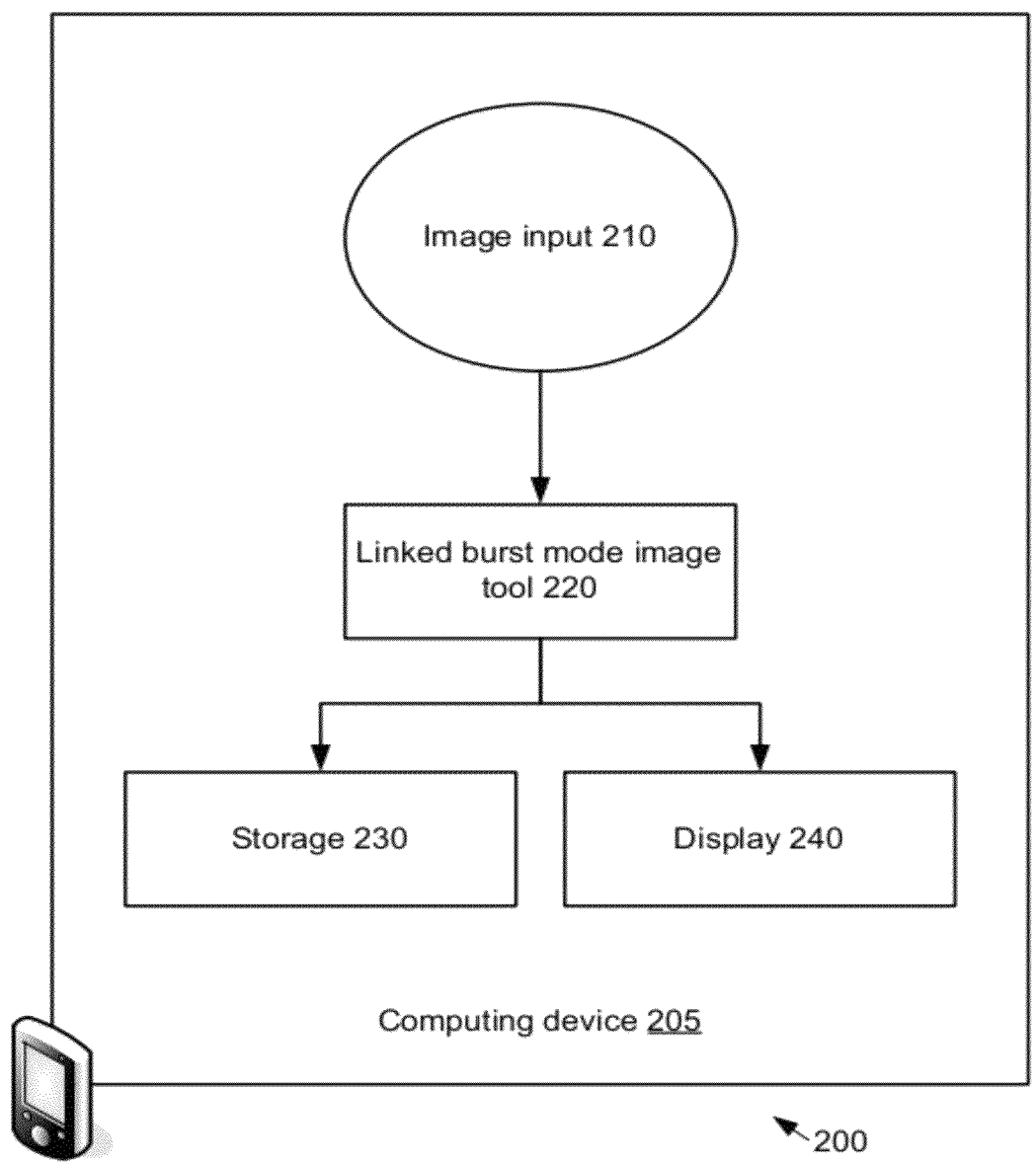
FIG. 2 is a block diagram of an exemplary system implementing burst mode image compression, decompression and display technology described herein.

FIG. 2 is a block diagram of an exemplary system 200 implementing one or more of the linked burst mode image technologies described herein. In the example, a computing device 205 implements a linked burst mode image tool 220 that accepts image input 210. The image input 210 can include image data captured by the computing device 205. For example, the computing device 205 can be a smartphone with an on-board digital camera (not shown) which can be used to obtain the image input 210 by capturing image data with the digital camera. Alternatively, the image input 210 can be obtained in some other way. For example, the computing device 205 can obtain image data in the form of image files (e.g., EXIF files), where the image data has be captured by some other device. In general, the image input 210 can be a single image or a set of images and can include other information such as metadata or user preference data (not shown) relating to the images. If present in the image input 210, metadata and user preference data can be contained within image files (e.g., EXIF files) or provided separately.

The linked burst mode image tool 220 links images in image input 210. For example, the linked burst mode image tool 220 creates metadata fields or adds information to existing metadata fields in an image file (e.g., an EXIF file) to link burst mode images. Linked burst mode image files can reduce demands on storage capacity compared to ordinary burst mode images while still allowing for easy reconstruction and display (e.g., on display 240)) of the burst mode images. Linked burst mode image files can be stored in storage 230. Linked burst mode images and linked burst mode image files are described in further detail herein.

In practice, the systems shown herein such as system 200 can be more complicated, with additional functionality, more complex relationships between system components, and the like. For example, the system 200 can include one or more encoders that compress image data, outputting a bit stream of compressed digital image information. The exact operations performed by the encoder can vary depending on compression format. For example, an encoder can compress image information according to a lossy compression format such as JPEG or a lossless compression format such as TIFF, and the compressed image information can be stored in an EXIF file. In lossy compression, some of the original image data is lost. Therefore, it can be useful to archive an original, uncompressed version of an image (or a version that uses lossless compression) prior to lossy compression.

The system 200 also can include one or more decoder to decompress compressed image data. The exact operations performed by the decoder can vary depending on compression format. For example, a JPEG-compliant decoder can decompress image information that has been compressed according to the JPEG standard and stored in an EXIF file.

As another example, the system 200 can include a preprocessor that smoothes input digital images using a lowpass filter or other filter so as to selectively remove high-frequency components. Or, the pre-processor performs other pre-processing tasks. The system 200 also can include a post-processor that performs post-processing operations on decompressed image data. For example, the post-processor can perform tasks specific to reducing image artifacts, such as block artifacts, banding artifacts, ringing artifacts, or artifacts resulting from demosaicing operations. Pre-processing operations also can include image resizing, exposure or dynamic range control, color temperature control, and color enhancement. Pre-processing operations and post-processing operations can be performed in different ways and in different combinations, depending on implementation and/or user preference.

The relationships shown between modules within the system 200 indicate general flows of information in the system; other relationships are not shown for the sake of simplicity. Depending on implementation and the type of processing desired, modules of the system can be added, omitted, split into multiple modules, combined with other modules, and/or replaced with like modules. Generally, the technologies described herein are generic to different operating systems or hardware and can be applied in any variety of environments to take advantage of the described features.

B. Example Techniques for Linking and Reconstructing Burst Mode Images

Figure 3:
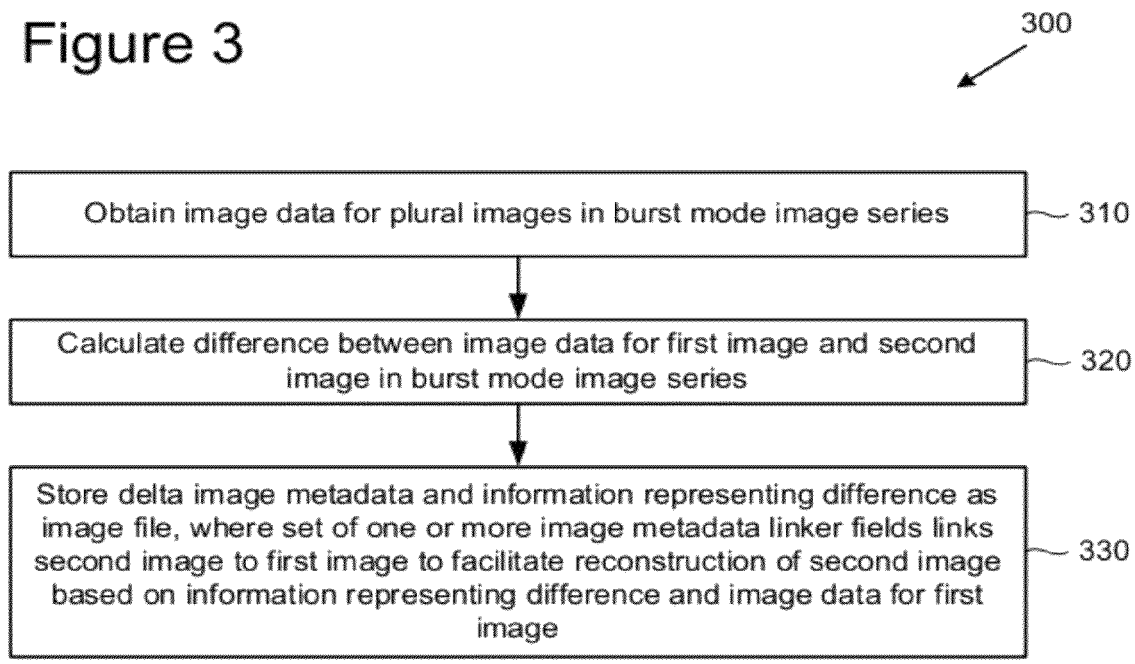
FIG. 3 is a flowchart of an exemplary burst mode image linking technique.

FIG. 3 shows an exemplary technique 300 for linking burst mode images, with an emphasis on acts performed when linking a delta image. A system such as the system 200 shown in FIG. 2 or other system performs the technique 300.

At 310, the system obtains image data for multiple images in a burst mode series. For example, a smartphone with digital camera functionality that performs the technique 300 can capture the image data while operating in a digital camera mode. The obtained image data can be compressed. To begin the process of compressing image data (e.g., according to the JPEG compression standard), the system can perform a forward frequency transform (e.g., discrete cosine transform) on the image data to produce transform coefficients for the image, and then quantize the transform coefficients. As another example, the system can obtain image data from pre-existing image files (e.g., from a local device or from a device at a remote location via a network).

The system can store root image metadata and information representing the image data for a first image as a root image file. The root image file can be an EXIF file. The root image metadata can include image metadata linker fields. The image metadata linker fields can be fields associated with a manufacturer tag (e.g., MakerNote) or some other tag in an EXIF file. The information representing the image data for the first image can be compressed according to the JPEG standard and stored in the EXIF file. Alternatively, the root image file can be some other type of file that contains or can be edited to contain metadata for linking burst mode images.

At 320, the system calculates a difference between image data for the first image and a second image in the burst mode series. For example, the system calculates a difference between image data for a first image taken at a first time instance and image data for a second image that is later in time than the first image. Alternatively, the second image is earlier in time than the first image. In one scenario, the first image can be the image that is earliest in time in a burst mode series (e.g., the first image captured after a shutter button is pressed when a digital camera device is in burst mode) relative to the other images in a burst mode series. Alternatively, the first image is later in time in the burst mode series. The image data (e.g., pixel data) defines the images themselves, and does not include image metadata.

Differences between image data can be calculated in different ways. For example, the system can determine differences between pixel values (e.g., numeric values that represent color values for different color channels), using mean square difference, sum of squared difference, or another metric to determine the magnitude of the difference between pixel values. Or, differences can be calculated between two images after performing a forward frequency transform and quantization on the respective image data, such that the difference is calculated between quantized transform coefficients for the respective images, using mean square difference, sum of squared difference, or another metric to determine the magnitude of the difference between quantized transform coefficient values. In some image formats, images are arranged in blocks of pixels (e.g., 8×8 blocks, 16×16 blocks, etc.). Differences can be calculated and measured on a pixel-by-pixel basis, on a block-by-block basis, or on some other basis. As another example, the system can search for matching pixel values or matching blocks of pixels and determine a motion vector that models motion in the images. Details of difference calculations, such as criteria for what constitutes a match and search patterns that are used for detecting matches, can vary depending on implementation. For example, the system can search for matches at nearby pixel locations, then gradually expand the search area (such as in an expanding spiral pattern) to match (e.g., within a specified range of pixel values) pixel or blocks of pixels in burst images.

The difference measure for an image can be compared with a threshold, and the image can be processed differently depending on how the difference measure compares with the threshold. For example, the system can classify an image as a delta image if the difference measure is less than a threshold, or the system can classify an image as a full image if the difference measure exceeds the threshold.

Different kinds of thresholds can be used, depending on the metric used for the difference measure. For example, the threshold can be a pre-defined value of mean square difference, sum of squared difference, or another metric. Or, the threshold value can be image-dependent (e.g., dependent on the bitrate of compressing the image as a full image). Or, the threshold can be a number of non-matching pixels or blocks of pixels. A determination of whether pixel values match or not can be based on different criteria. For example, the system can look for exact matches between pixel values or for matches within a specified tolerance (e.g., within a range of pixel values). As another example, the system can look for exact matches between all pixel values in a block of pixels, or for a match between some percentage of pixel values (e.g., 50%) in a block of pixels. The system also can compare an overall bitrate of delta coding for an image to a bitrate of full coding for image, then select whichever coding results in the lowest bitrate.

At 330, the system stores delta image metadata and information representing the difference as a delta image file. A set of one or more image metadata linker fields (e.g., in the image metadata) links the second image to the first image to facilitate reconstruction of the second image based on the information representing the difference and the image data for the first image. The image metadata linker fields can include a root image identifier field that identifies (e.g., with a globally unique identifier (GUID)) the root image, and an image index field comprising an index value that represents an index in the burst mode image series for the second image relative to the first image. The information representing the difference can be compressed or uncompressed. The delta image file can be an EXIF file. The image metadata linker fields can be fields associated with a manufacturer tag (e.g., MakerNote) or some other tag in an EXIF file. Alternatively, the delta image file can be some other type of file that contains or can be edited to contain metadata for linking burst mode images.

A root image file can include embedded data (e.g., information representing the difference). Embedded data can facilitate reconstruction of the second image without referring to data in another image file. Embedded data can be useful, for example, where it is desirable to have all the necessary image data for reconstructing a delta image in the same file (e.g., where image data from another image is not or may not be available at reconstruction time).

The calculating 320 and storing 330 acts shown in FIG. 3 are repeated for other delta images in the burst mode series. Thus, for example, the system can repeat the calculation of the difference, the calculation of the difference measure, the comparison with the threshold, and the classification for other images, respectively, in the burst mode series. Acts shown in FIG. 3 can be performed concurrently for different images. For example, the system stores delta image metadata and difference information for a second image while calculating the difference between the second image and a third image in the burst mode series, and while obtaining image data for a fourth image in the burst mode series.

The first image can be reconstructed based on information (in the root image file) representing image data for the first image. Then, the second image can be reconstructed based on the set of image metadata linker fields, the information representing the difference for the second image, and the image data for the first image. For example, the system can identify a root image file based on the root image identifier field in image metadata for the second image and obtain image data for the first image from the root image file. The system can then reconstruct the difference and combine the difference with the image data for the first image to reconstruct the second image.

Figure 4:
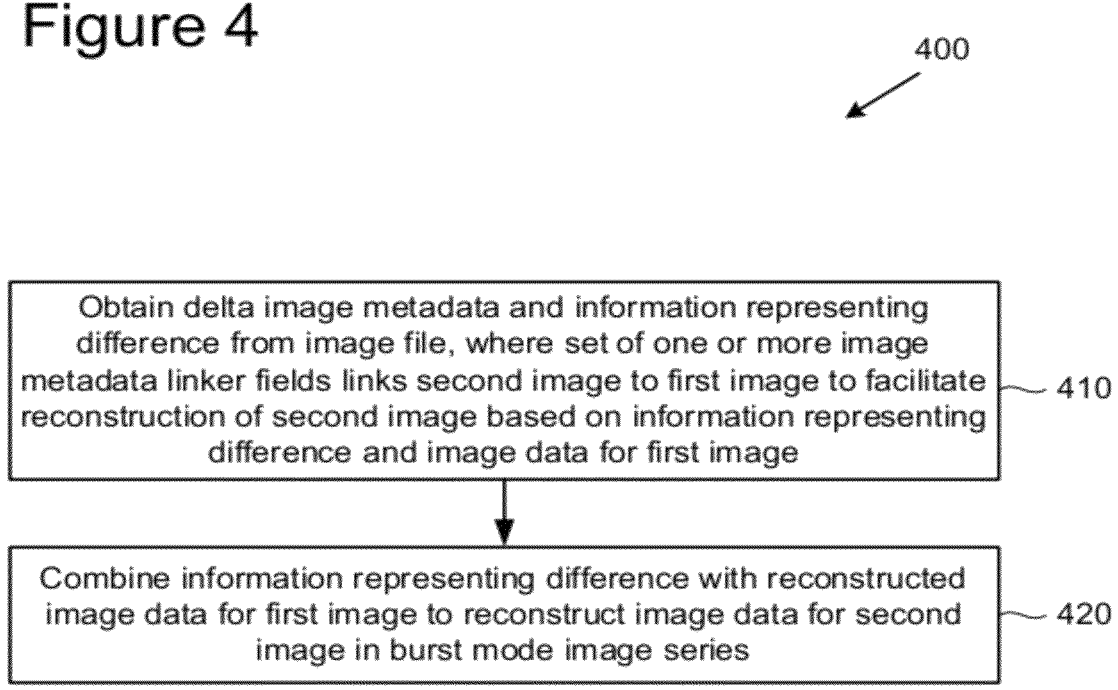
FIG. 4 is a flowchart of an exemplary linked burst mode image reconstruction technique.

FIG. 4 shows an exemplary technique 400 for reconstructing linked burst mode images, with an emphasis on acts performed when reconstructing a delta image. A system such as the system 200 shown in FIG. 2 or other system performs the technique 400.

At 410, the system obtains delta image metadata and information representing a difference from a delta image file. The difference is a difference between image data for a first image and a second image in a linked burst mode image series. A set of one or more image metadata linker fields links the second image to the first image to facilitate reconstruction of the second image based on the information representing the difference and image data for the first image.

At 420, the system combines the information representing the difference with reconstructed image data for the first image in order to reconstruct image data for the second image. For example, the system decompresses compressed difference information obtained from a delta image file and combines it with decoded image data from a root image file. In general, reconstruction techniques performed by the system can be adjusted to account for differences in compression techniques or linking techniques. For example, if a forward frequency transform and quantization is applied to image data before a difference is calculated, the system can perform inverse quantization and inverse frequency transforms after combining the information representing the difference with reconstructed image data for the first image.

The obtaining 410 and combining 420 acts shown in FIG. 4 are repeated for other delta images in the burst mode series. Thus, for example, the system can repeat the obtaining of the difference and the combination of the difference with image data for a previous image for other images, respectively, in the burst mode series. Acts shown in FIG. 4 can be performed concurrently for different images.

C. Example Data Flow in Linked Burst Mode Image Compression

Figure 5:
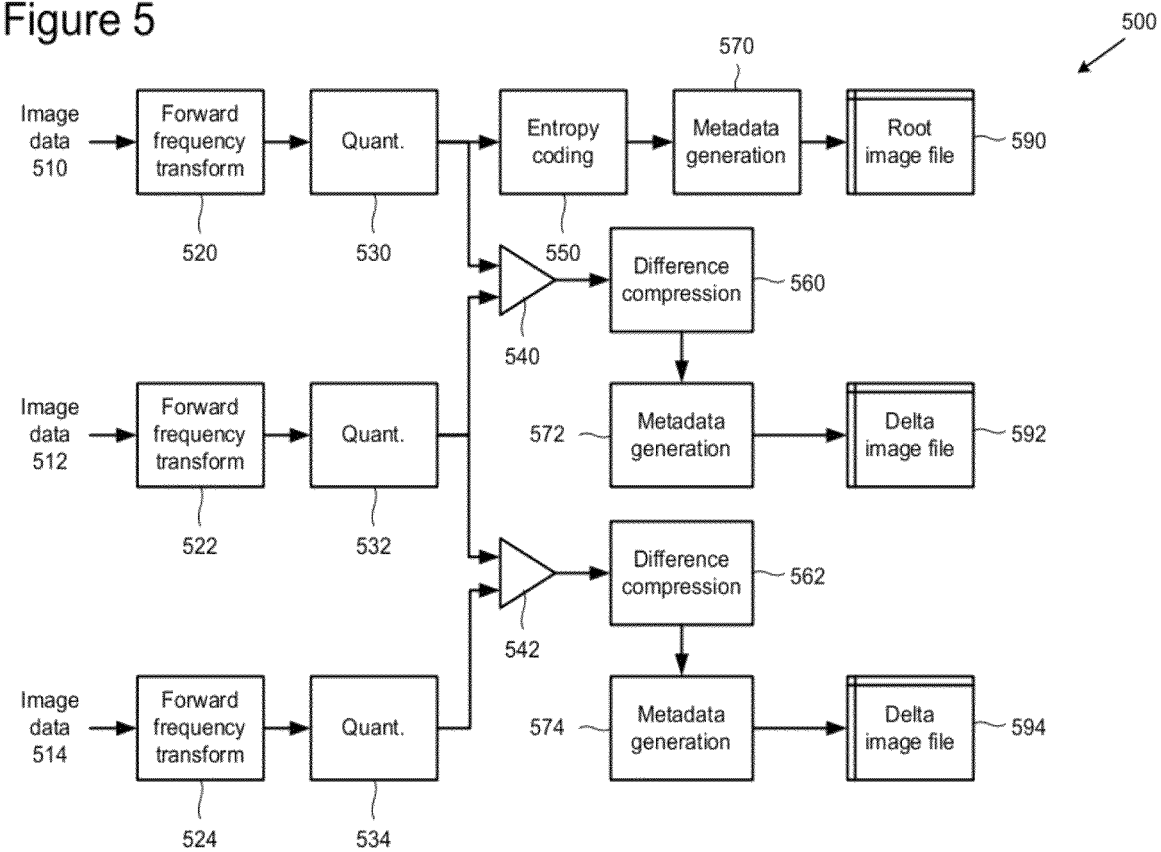
FIG. 5 is a flowchart of an exemplary linked burst mode image compression data flow.

FIG. 5 is a flowchart showing data flow 500 in a system that combines linking of burst mode images with other data compression techniques (e.g., JPEG compression). A system such as the system 200 shown in FIG. 2 or other system performs functions shown in FIG. 5.

In FIG. 5, the system takes as input image data 510, 512, 514 corresponding to a first, second and third image, respectively, in a burst mode image series. The system performs forward frequency transforms (e.g., discrete cosine transforms) 520, 522, 524 to produce transform coefficients from the image data 510, 512, 514, and performs quantization 530, 532, 534 on the respective transform coefficients. The system performs entropy encoding 550 on the quantized transform coefficients for the first image and performs metadata generation 570 for the first image. The generated metadata indicates that the first image is a root image in a linked burst mode image series. The root image acts as a reference for other images in the linked burst mode series. The system can classify a particular burst image as a root image in different ways. For example, the system can classify the burst image that was captured first in a burst mode series as the root image for the series. As another example, the system can classify a later-captured burst image as the root image (e.g., the third burst image in a five-image burst series). Alternatively, a burst image can be classified as a root image in some other way (e.g., based on user preference information). The generated metadata is stored along with the entropy encoded image data in root image file 590 which can be, for example, an EXIF file.

The system performs difference calculations 540 to calculate a difference between quantized transform coefficients of the first image and the second image, and performs difference calculations 542 between quantized transform coefficients of the second image and the third image. Although not shown in FIG. 5, the system can also determine a difference measure and determine (e.g., based on a comparison between the respective calculated difference measures and a threshold) that the second image and the third image are delta images, as opposed to full images. The system performs difference compression 560, 562 on the respective difference information. The difference compression can use the same entropy coding as the entropy coding of image data for root images, or it can use different entropy coding. Alternatively, difference compression is omitted.

The system performs metadata generation 572, 574 for the second image and the third image, respectively. The generated metadata for the second image indicates that the second image is a delta image in the linked burst mode image series. The generated metadata for the second image is stored along with the compressed difference information in delta image file 592 which can be, for example, an EXIF file. The generated metadata for the third image indicates that the third image is a delta image in the linked burst mode image series. The generated metadata for the third image is stored along with the compressed difference information in delta image file 594 which can be, for example, an EXIF file. Other information, such as a thumbnail version of the root image, also can be stored in delta image files. Storing a thumbnail version of a root image in a delta image file can be useful to display in some image viewers, so that an approximation of the delta image can be easily shown.

FIG. 5 shows compression for three images in a burst mode series. Alternatively, a system compresses fewer images (e.g., two) or more images in a burst mode series. Moreover, although FIG. 5 shows three data paths (for the three images, respectively), alternatively the data flow includes fewer paths. For example, the data flow include a data path for root image compression and a data path for delta image compression, in which the difference is added to buffered image data for the previous image. Or, the data flow includes a single data path, with buffered quantized image data for the previous image selectively subtracted from results of quantization for a delta image but not for a root image.

D. Example Data Flow in Linked Burst Mode Image Decompression

Figure 6:
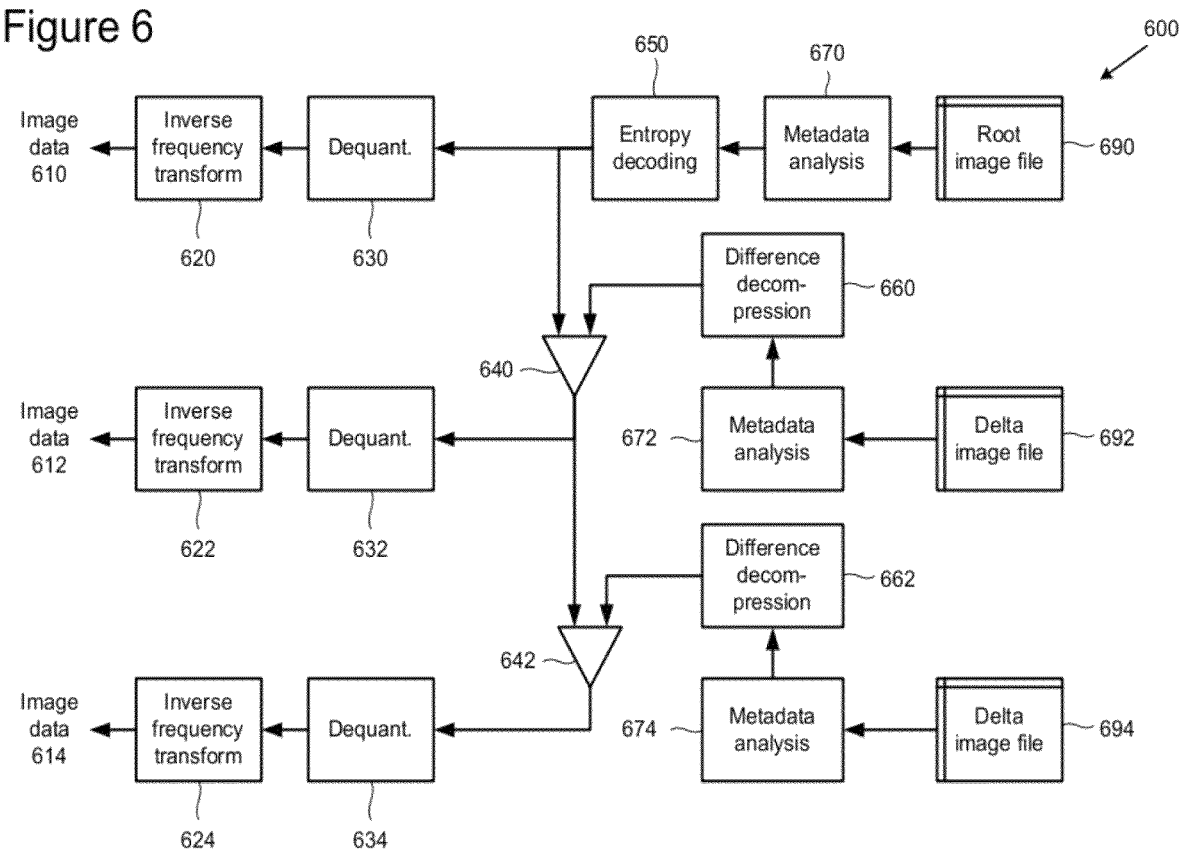
FIG. 6 is a flowchart of an exemplary linked burst mode image decompression data flow.

FIG. 6 is a flowchart of an exemplary linked burst mode image decompression data flow 600. Techniques described with reference to FIG. 6 can be used, for example, to decompress burst mode images that have been compressed according to the compression data flow 500 shown in FIG. 5. A system such as the system 200 shown in FIG. 2 or other system performs functions shown in FIG. 6.

In FIG. 6, the system performs metadata analysis 670 on metadata from a root image file 690 corresponding to a first burst image. The root image file 690 can be, for example, an EXIF file. The metadata indicates that the first burst image is a root image in a linked burst mode image series. The root image acts as a reference for other images in the linked burst mode series. The system performs entropy decoding 650 on encoded image data from the root image file 690.

The system performs metadata analysis 672, 674 on metadata from delta image files 692, 694 for second and third burst images, respectively. The delta image files 692, 694 can be, for example, EXIF files. The metadata from delta image files 692, 694 indicates that the second and third images, respectively, are delta images in the linked burst mode image series. For example, the metadata includes an identifier for the root image in the linked burst mode image series and an index for the respective delta image. Exemplary metadata fields are described in more detail below.

The system performs decompression 660, 662 on compressed difference information from delta image files 692, 694, respectively. The difference decompression can use the same entropy decoding as the entropy decoding of image data for root images, or it can use different entropy decoding. Alternatively, where difference information is not compressed, decompression of difference information is omitted.

The system combines 640, 642 decompressed difference information with previously reconstructed image data. At 640, the system combines decompressed difference information from delta image file 692 with decoded image data from root image file 690 to reconstruct image data for the second burst image. At 642, the system combines decompressed difference information from delta image file 694 with the reconstructed image data for the second burst image to reconstruct image data for the third burst image.

The system performs dequantization 630, 632, 634 to obtain dequantized transform coefficients, and performs inverse frequency transforms (e.g., inverse DCT) 620, 622, 624 on the respective transform coefficients. The system outputs image data 610, 612, 614 corresponding to the first, second and third burst images, respectively.

FIG. 6 shows decompression for three images in a burst mode series. Alternatively, a system decompresses fewer images (e.g., two) or more images in a burst mode series. Moreover, although FIG. 6 shows three data paths (for the three images, respectively), alternatively the data flow includes fewer paths. For example, the data flow include a data path for root image decompression and a data path for delta image decompression, in which the difference is added to buffered image data for the previous image. Or, the data flow includes a single data path, with buffered image data for the previous image selectively added to results of entropy decoding for a delta image but not for a root image.

E. Exemplary Image Metadata Linker Fields

This section describes exemplary linker fields that can be used in image metadata in EXIF files. The term "linker field" is used herein to refer to metadata fields that can be used to link burst images or identify burst images as linked burst images. A linker field can be distinguished from other metadata fields that can appear in image files, such as fields that provide information on image attributes such as shutter speed, focal length, etc.

In examples described herein, the EXIF MakerNote tag is used for linking burst images. Metadata can be associated with the MakerNote tag to preserve or establish temporal relationships between burst images. MakerNote is an open-ended ASCII field defined in the EXIF standard. Using EXIF metadata to link images allows linking images without relying on file names, which can change and disrupt linking.

Table 1 below shows a set of exemplary image metadata linker fields that can be used with the MakerNote tag for linking burst mode images. Alternatively, more or fewer linker fields can be used. Length of the data in each field is also shown in Table 1. Alternatively, linker fields that perform the described functions can occupy different lengths of data.

TABLE 1

Exemplary linker fields.

| Field | Description | Length |
|---|---|---|
| <CONST_GUID> | GUID identifying images of this format (linked burst mode images). Constant in all linked burst mode images. | GUID (16 bytes) |
| <GUID_OF_ROOT_IMAGE> | GUID identifying the root image of the series. | GUID (16 bytes) |
| <INDEX_THIS> | Index of the current image. An index value of 0 represents the root image. | Byte |
| <IS_FULL_IMAGE> | Indicator of delta image or full image. E.g., if difference threshold was exceeded during compression, this file contains a full (non-delta) image. | Bit |
| <START_INDEX> | Present only for root images (<INDEX_THIS> = 0). First index in series. | Byte |
| <END_INDEX> | Present only for root images (<INDEX_THIS> = 0). Last index in series. | Byte |

TABLE 1-continued

Exemplary linker fields.

| Field | Description | Length |
|---|---|---|
| <END_OF_SEQ> | Indicates end of metadata sequence. Inserted at the end of MakerNote data. | INT (4 bytes) |

<CONST_GUID> is an image format identifier field that allows an image file to be identified as a linked burst mode image file. <CONST_GUID> can be used, for example, to determine which images to show in a library view. (Exemplary library views are described in further detail below.)

<GUID_OF_ROOT_IMAGE> is a root image identifier field comprising an identifier of a root image for the burst mode image series. In a linked burst mode image series with one root image, <GUID_OF_ROOT_IMAGE> will be the same for each image file in the series. <GUID_OF_ROOT_IMAGE> allows the root image to be identified even if the file name is changed.

<INDEX_THIS> is an image index field comprising an index value representing an index of a given image in the burst mode image series. For example, if a current image is a root image in a burst series, <INDEX_THIS>=0. If the current image precedes the root image in the burst series, <INDEX_THIS> is negative. If the current image follows the root image in the burst series, <INDEX_THIS> is positive. If the current image is a delta image, <INDEX_THIS> allows a system to determine which other image or images are to be reconstructed before the current image is reconstructed. For example, if <INDEX_THIS> is 1 for a current image, and the current image is a delta image, the current image can be reconstructed by combining difference information with image data from the root image (at index 0).

Some linker fields will not be present unless the current image is a root image. Two examples are <START_INDEX> and <END_INDEX>. <START_INDEX> is a start index value representing a starting index for the burst mode image series. For example, if the first image in the burst series is the root image, <START_INDEX> is 0. If the first image in the series is not the root image, <START_INDEX> is negative. <END_INDEX> is an end index value representing an ending index for the burst mode image series. For example, if the last image in the series is not the root image, <END_INDEX> is positive. If the last image in the series is the root image, <END_INDEX> is 0. <START_INDEX> and <END_INDEX> can be used to indicate how many other images are in a burst series and the temporal position of the root image within the burst series.

<IS_FULL_IMAGE> is a bit that indicates whether the given image is a full image or a delta image. If the current image is a root image, or if a calculated difference measure for the current image has exceeded a threshold, the current image is a full image and <IS_FULL_IMAGE>=1. Otherwise, the current image is a delta image and <IS_FULL_IMAGE>=0. Alternatively, <IS_FULL_IMAGE> can be omitted. For example, if a root image is always required to be a full image, the value of <IS_FULL_IMAGE> can be implied and need not be included for root images (e.g., where <INDEX_THIS>=0).

<END_OF_SEQ> indicates the end of the image metadata linker fields for the file. <END_OF_SEQ> can be any value. However, it can be useful for <END_OF_SEQ> to be a value that will not be repeated elsewhere in the image metadata linker fields in order to avoid accidentally emulating <END_OF_SEQ> before the end of the image metadata linker fields has actually been reached.

Exemplary image metadata linker field layouts 710, 720, 730 are shown in FIG. 7. In layout 710, <INDEX_THIS> is represented by the value 0, indicating that the current image is a root image. <IS_FULL_IMAGE> is represented by the value 1, indicating that the current image is a full image. The value for <IS_FULL_IMAGE> is followed by <START_INDEX>, <END_INDEX> and <END_OF_SEQ>. In layout 720, <INDEX_THIS> is represented by the value N (where N is not 0), indicating that the current image is not a root image. <IS_FULL_IMAGE> is represented by the value 0, indicating that the current image is a delta image and not a full image. The value for <IS_FULL_IMAGE> is followed by <END_OF_SEQ>.

Table 2 below shows a set of exemplary embedded data linker fields that can be used with the MakerNote tag in root images where embedded data is present. Alternatively, more or fewer embedded linker fields can be used. Length of the data in each field is also shown in Table 2. Alternatively, embedded data linker fields that perform the described functions can occupy different lengths of data.

TABLE 2

Exemplary embedded data linker fields for root images.

| Field | Description | Length |
|---|---|---|
| <EMBEDDED_INDEX> | Index of image corresponding to embedded data (must be >= <START_INDEX> && <= <END_INDEX> && ! = 0) | Byte |
| <SIZE_EMBEDDED> | Size of embedded data | INT (4 bytes) |
| <EMBEDDED_DATA> | Compressed embedded data. | <SIZE_EMBEDDED> |

The embedded data linker fields can be used to embed data for other images in the series. For example, difference information for a delta image (or multiple delta images) can be embedded in the root image using embedded data linker fields. This provides an ability to reconstruct more than one image by accessing only one image file.

When present in root image metadata, <EMBEDDED_INDEX> provides an index value for another image in the same series (e.g., a delta image) that is represented by the embedded data, and so <EMBEDDED_INDEX> is restricted to be greater than or equal to <START_INDEX> and less than or equal to <END_INDEX>, but not equal to 0 (which represents the root image). <SIZE_EMBEDDED> is a value that indicates the size of the embedded data, and <EMBEDDED_DATA> is the embedded data itself. <EMBEDDED_DATA> can include, for example, compressed or uncompressed information representing a difference between image data for the root image and image data for the image that has been classified as the delta image.

In layout 730, <INDEX_THIS> is represented by the value 0, indicating that the current image is a root image. <IS_FULL_IMAGE> is represented by the value 1, indicating that the current image is a full image. The value for <IS_FULL_IMAGE> is followed by <START_INDEX>, <END_INDEX> and the embedded data linker fields, followed by <END_OF_SEQ> to indicate the end of the linker fields.

Alternatively, metadata for linked burst mode images in a burst mode series is stored in another format or stored in a tag other than the MakerNote tag in an EXIF file.

F. Exemplary Techniques for Finding/Displaying Linked Burst Mode Images

This section describes exemplary techniques for finding and displaying linked burst mode images in a system such as system 200.

For example, the system can scan a file directory for image files (e.g., EXIF files) and look for image metadata linker fields in the image files. The system can display images (or thumbnail versions of images) from image files where the <CONST_GUID> field is not present (e.g., unlinked burst mode image files, image files that are not burst mode image files, etc.). The system also can display images (or thumbnail versions of images) from image files where the <CONST_GUID> field is present (e.g., linked burst mode image files). For burst mode image files, the system can use a filtered library view for a cleaner viewing experience. In a filtered library view, the system can display images (or thumbnail versions of images) from image files where the <CONST_GUID> field is present and <INDEX_THIS> is equal to 0 (indicating that an image is a root image), while omitting images where <INDEX_THIS> is not equal to 0 (indicating that an image is not a root image).

Figure 8:
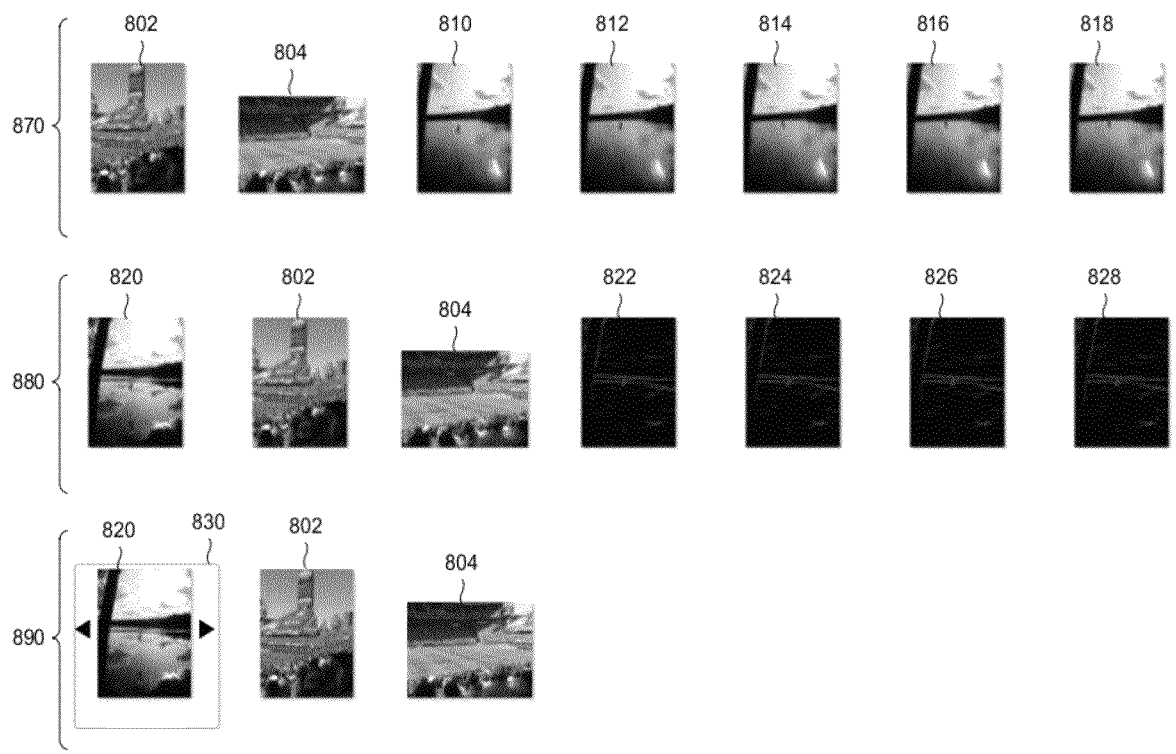
FIG. 8 is a diagram showing a comparison of library views for burst mode images.

FIG. 8 shows a comparison of library views for burst mode images. Arrangement 870 is an example library view where thumbnail versions of non-burst images 802, 804 are shown along with thumbnail versions of unlinked burst images 810, 812, 814, 816, 818. Arrangement 880 is an example library view where a thumbnail version of root image 820 in a linked burst mode image series is shown along with thumbnail versions of delta images 822, 824, 826, 828 in an unfiltered view. Arrangement 890 is an example library view where the thumbnail version of root image 820 is shown while the thumbnail versions of delta images in the linked burst mode image series remain hidden in a filtered view. Arrangement 890 includes a user interface (UI) element 830 comprising the thumbnail version of the root image 820 surrounded by a border and arrows to indicate that a user can navigate backward or forward to other images in the series. UI) element 830 acts an indicator of the burst mode image series in the filtered library view. Arrangement 890 gives an uncluttered library view, while the linking of the burst mode images saves significantly on storage costs.

A root image (represented by an index value of 0) can be located at different positions in a burst mode image series. For example, a root image can be located between images that are earlier in time (represented by negative index values) and images that are later in time (represented by positive index values) in a burst mode image series. In one scenario, images that are later in time are captured after a user presses a shutter button on an image capture device operating in a burst mode, and images that are earlier in time are obtained from one or more buffers that contain previously captured images (e.g., images captured before a current press of a shutter button). The amount of images before or after a root image can vary based on, for example, user preferences, camera settings, or application design considerations. Or, in another scenario, the middle image in a burst mode series is selected to be the root image.

Figure 9:
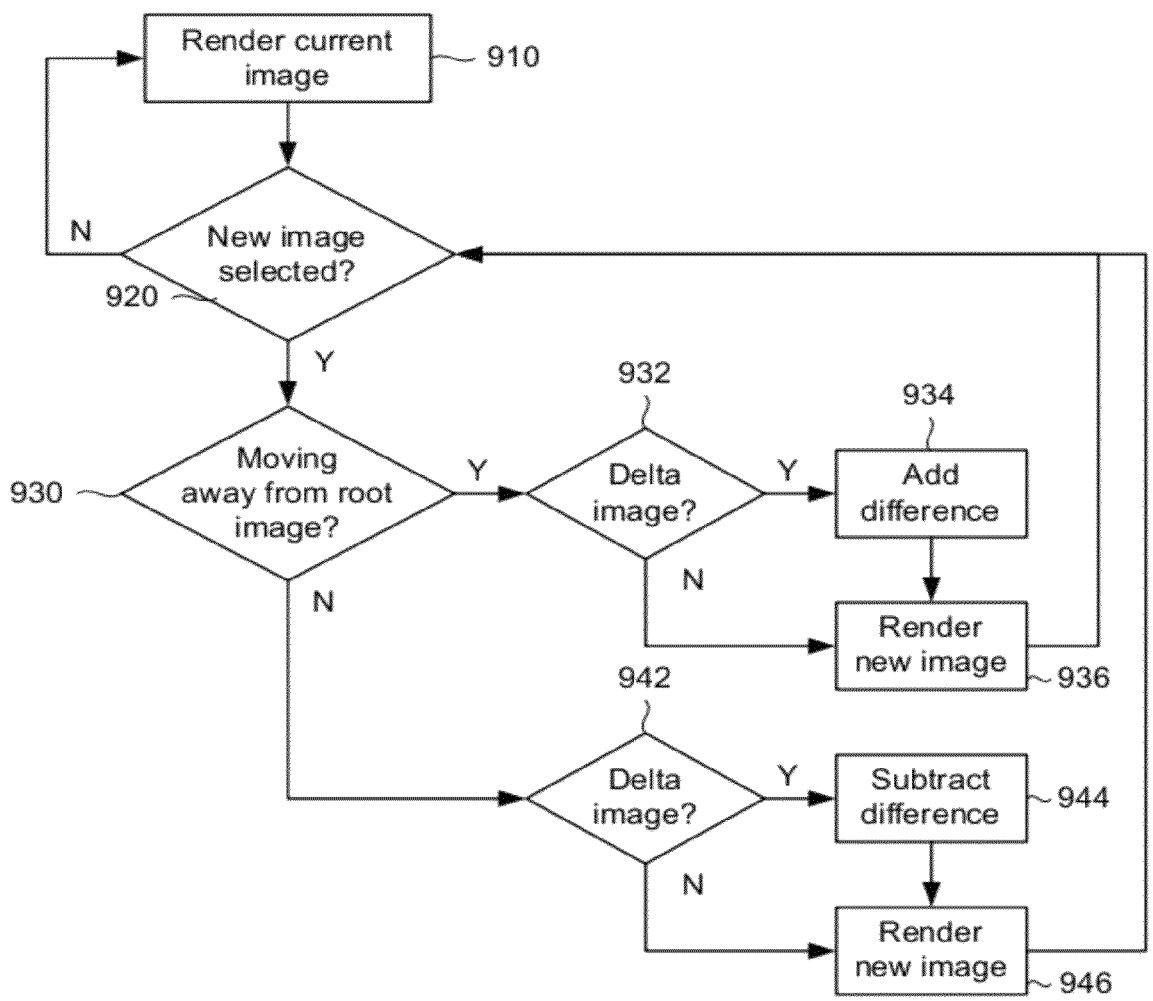
FIG. 9 is a flowchart of an exemplary technique for rendering selected images in a series of linked burst mode images

FIG. 9 shows a technique 900 for rendering selected images in a series of linked burst mode images. The technique 900 can be performed, for example, when a user is viewing the images on a display. At 910, the system renders a current image. For example, a user selects a root image and the system renders the selected root image. At 920, the system then determines whether a new image has been selected. For example, the system detects user input associated with a UI element (e.g., UI element 830 in FIG. 8).

At 930, if a new image has been selected the system determines whether the selection has caused movement away from (e.g., further away in time in the burst series) the root image. For example, the system compares the value of <INDEX_THIS> in the new image to the value of <INDEX_THIS> in the previous image. A greater absolute value of <INDEX_THIS> for the new image indicates that the new image is further away in time from the root image. A smaller absolute value of <INDEX_THIS> for the new image indicates that the new image is closer in time to the root image. At 932, if the movement is away from the root image the system determines whether the new image is a delta image. For example, the system checks whether the value of <IS_FULL_IMAGE> in the new image is 0, indicating that the current image is a delta image. At 934, if the new image is a delta image the system adds the difference information for the delta image to reconstructed image data for the previously reconstructed image. The system then renders (936) the new image.

If a new image has been selected and the selection has not caused movement away from the root image, then the selection has caused movement toward the root image (e.g., closer in time to the root image in the burst series). At 942, the system determines whether the new image is a delta image. At 944, if the new image is a delta image the system subtracts the difference information for the delta image from reconstructed image data for the previously reconstructed image. The system then renders (946) the new image.

Various performance optimizations are possible for library views. For example, the system can store all delta images in a folder separate from other image files and create a database of root image/delta image relationships (e.g., using file names or other identifiers for the images), which can be used for efficient lookup and display.

G. Exemplary Approaches for Parameter Control

Figure 10:
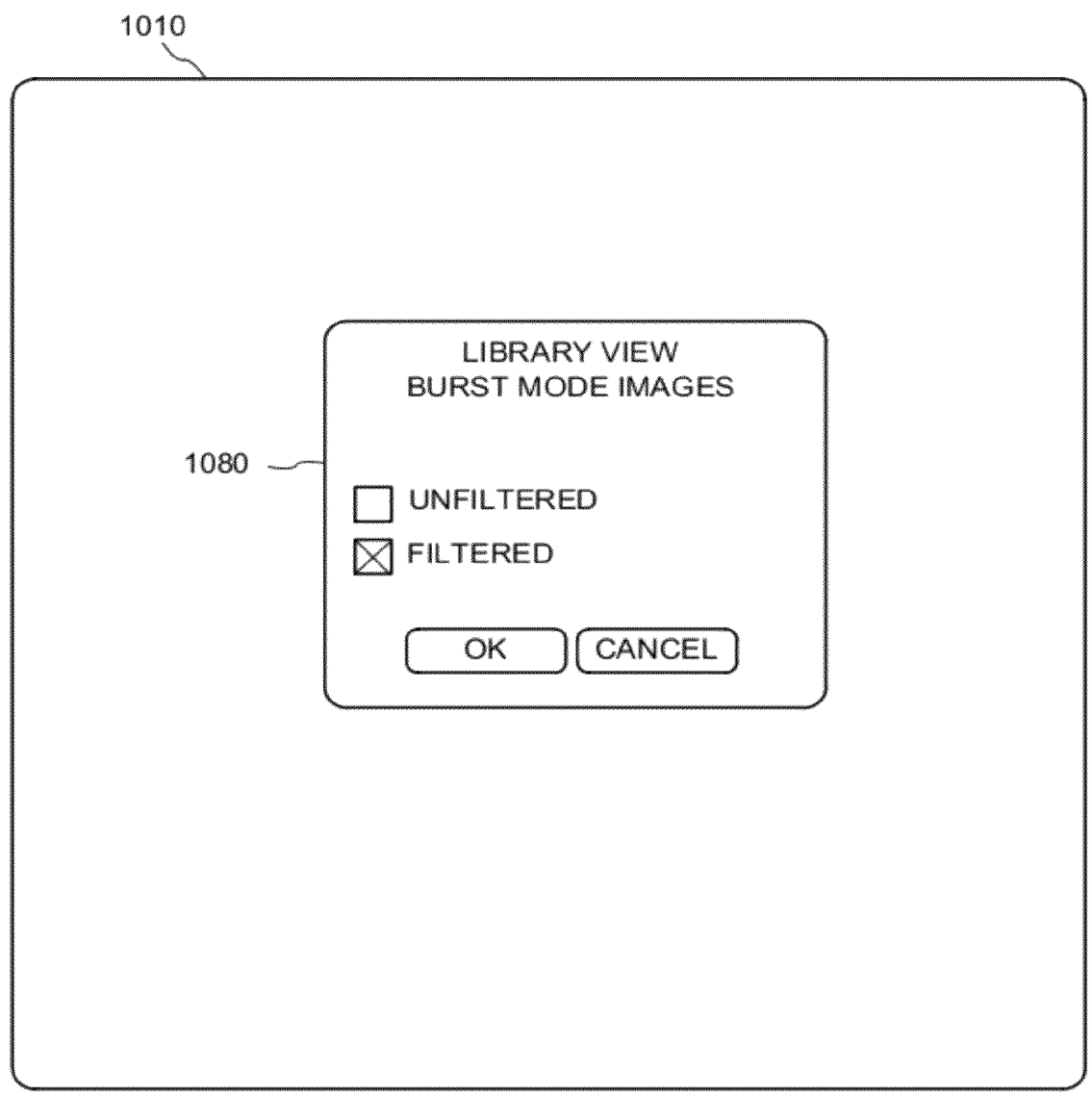
FIG. 10 is a diagram of an exemplary user interface for adjusting parameters relating to linked burst mode image technology.

This section describes exemplary approaches to user interaction with systems that compress or decompress burst mode images, and/or render or display compressed or decompressed burst mode images. The system provides one or more controls for setting user preferences for linked burst mode image parameters. FIG. 10 shows an example user interface 1010. The user interface 1010 includes a window 1080 with check-box and button controls that can be used to set parameters for displaying burst mode images. In the example, check-boxes are provided for selecting whether burst mode images are to be displayed in a filtered library view or in an unfiltered library view. The user interface 1010 also can include user interface elements for setting other parameters relating to burst mode images, such as a threshold that a system can use to determine, based on difference information, whether an image in a burst mode image series will be encoded as a delta image or a full image.

H. Experimental Results

Experiments were conducted to compare storage utilization with and without linking of burst mode image files for seven images. Each image had a file size of approximately 700 kb, for a total size of approximately 4900 kb without linking. Two images were standalone, non-burst images, and five images were images in a burst series. The burst images were linked to produce 1 root image having a size of approximately 700 kb and 4 delta images each having a size of approximately 130 kb, making the total size of the 7 images approximately 3*700 kb+4*130 kb=2620 kb with linking. The fractional size of each delta image compared to the root image was approximately 130/700=0.19. The storage needed for a total of N burst images with linking can thus be approximated as: $(1+(N-1)*0.19))*$<average burst image size>, compared with N*<average full burst image size> for unlinked burst mode images. The file sizes described above (e.g., full burst image sizes and delta image sizes) can vary from the described examples depending on image resolution, the degree of difference between images, and other factors.

III. Example Computing Environment

Figure 11:
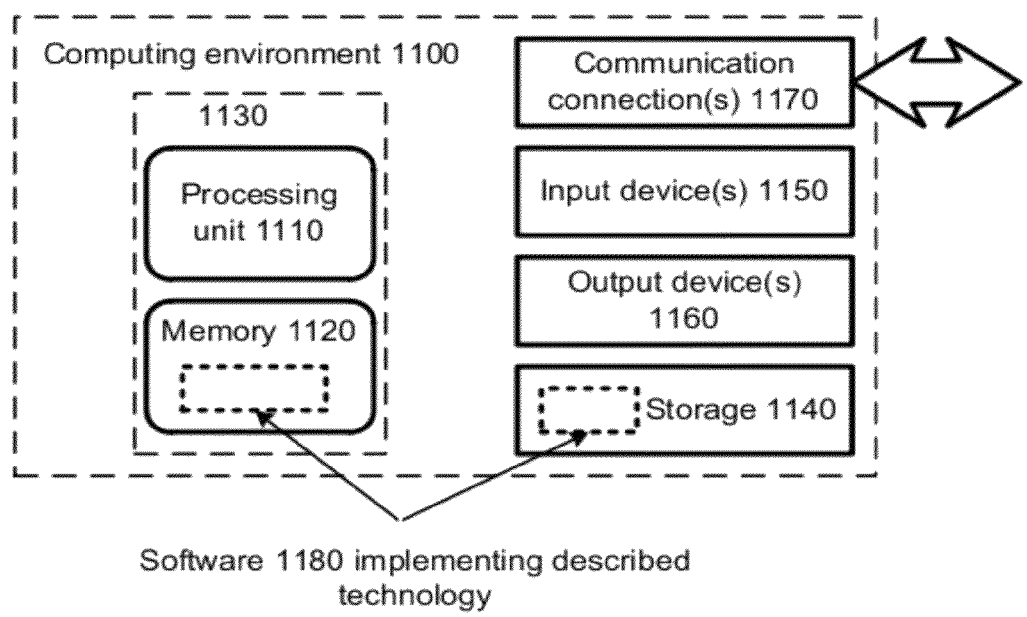
FIG. 11 is a block diagram of an exemplary computing environment suitable for implementing any of the technologies described herein

FIG. 11 illustrates a generalized example of a suitable computing environment 1100 in which the described technologies can be implemented. The computing environment 1100 is not intended to suggest any limitation as to scope of use or functionality, as the technologies may be implemented in diverse general-purpose or special-purpose computing environments.

With reference to FIG. 11, the computing environment 1100 includes at least one processing unit 1110 coupled to memory 1120. In FIG. 11, this basic configuration 1130 is included within a dashed line. The processing unit 1110 executes computer-executable instructions and may be a real or a virtual processor. In a multi-processing system, multiple processing units execute computer-executable instructions to increase processing power. The memory 1120 may be volatile memory (e.g., registers, cache, RAM), non-volatile memory (e.g., ROM, EEPROM, flash memory, etc.), or some combination of the two. The memory 1120 can store software 1180 implementing any of the technologies described herein.

A computing environment may have additional features. For example, the computing environment 1100 includes storage 1140, one or more input devices 1150, one or more output devices 1160, and one or more communication connections 1170. An interconnection mechanism (not shown) such as a bus, controller, or network interconnects the components of the computing environment 1100. Typically, operating system software (not shown) provides an operating environment for other software executing in the computing environment 1100, and coordinates activities of the components of the computing environment 1100.

The storage 1140 may be removable or non-removable, and includes magnetic disks, magnetic tapes or cassettes, CD-ROMs, CD-RWs, DVDs, or any other computer-readable media which can be used to store information and which can be accessed within the computing environment 1100. The storage 1140 can store software 1180 containing instructions for any of the technologies described herein.

The input device(s) 1150 may be a touch input device such as a keyboard, mouse, pen, or trackball, a voice input device, a scanning device, or another device that provides input to the computing environment 1100. The output device(s) 1160 may be a display, printer, speaker, CD- or DVD-writer, or another device that provides output from the computing environment 1100. Some input/output devices, such as a touchscreen, may include both input and output functionality.

The communication connection(s) 1170 enable communication over a communication mechanism to another computing entity. The communication mechanism conveys information such as computer-executable instructions, audio/video or other information, or other data. By way of example, and not limitation, communication mechanisms include wired or wireless techniques implemented with an electrical, optical, RF, infrared, acoustic, or other carrier.

The techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

Any of the storing actions described herein can be implemented by storing in one or more computer-readable media (e.g., computer-readable storage media or other tangible media). Any of the things described as stored can be stored in one or more computer-readable media (e.g., computer-readable storage media or other tangible media).

Any of the methods described herein can be implemented by computer-executable instructions in (e.g., encoded on) one or more computer-readable media (e.g., computer-readable storage media or other tangible media). Such instructions can cause a computer to perform the method. The technologies described herein can be implemented in a variety of programming languages.

Any of the methods described herein can be implemented by computer-executable instructions stored in one or more computer-readable storage devices (e.g., memory, CD-ROM, CD-RW, DVD, or the like). Such instructions can cause a computer to perform the method.

IV. Example Implementation Environment

Figure 12:
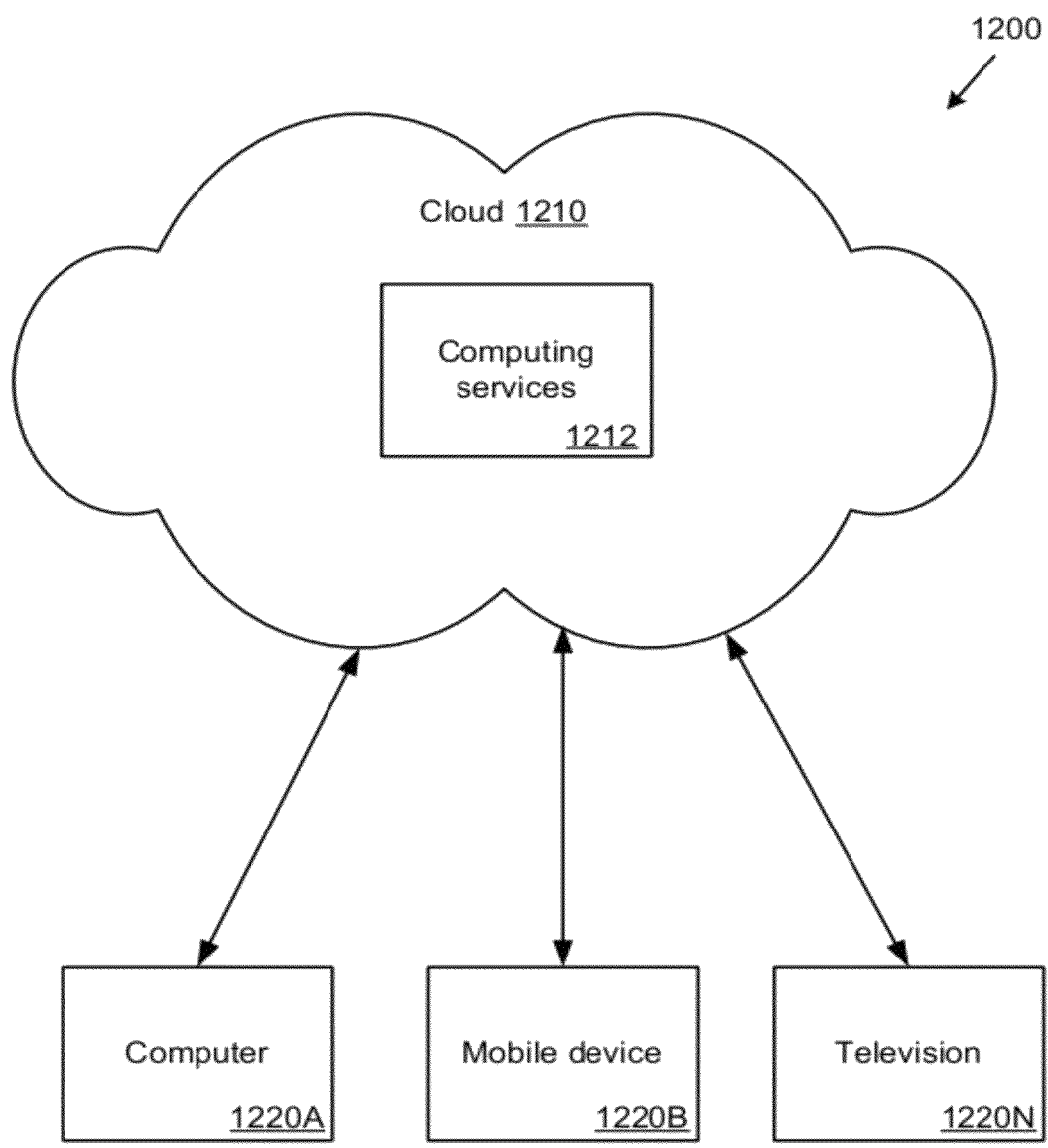
FIG. 12 is a block diagram of an exemplary cloud computing arrangement suitable for implementing any of the technologies described herein.

FIG. 12 illustrates a generalized example of a suitable implementation environment 1100 in which described embodiments, techniques, and technologies may be implemented.

In example environment 1200, various types of services (e.g., computing services 1212) are provided by a cloud 1210. For example, the cloud 1210 can comprise a collection of computing devices, which may be located centrally or distributed, that provide cloud-based services to various types of users and devices connected via a network such as the Internet. The cloud computing environment 1200 can be used in different ways to accomplish computing tasks. For example, with reference to described techniques and tools, some tasks, such as processing user input and presenting a user interface, can be performed on a local computing device, while other tasks, such as storage of data to be used in subsequent processing, can be performed elsewhere in the cloud.

In example environment 1200, the cloud 1210 provides services for connected devices with a variety of screen capabilities 1220A-N. Connected device 1220A represents a device with a mid-sized screen. For example, connected device 1220A could be a personal computer such as desktop computer, laptop, notebook, netbook, or the like. Connected device 1220B represents a device with a small-sized screen.

For example, connected device 1220B could be a mobile phone, smart phone, personal digital assistant, tablet computer, and the like. Connected device 1220N represents a device with a large screen. For example, connected device 1220N could be a television (e.g., a smart television) or another device connected to a television or projector screen (e.g., a set-top box or gaming console).

A variety of services can be provided by the cloud 1210 through one or more service providers (not shown). For example, the cloud 1210 can provide services related to mobile computing to one or more of the various connected devices 1220A-N. Cloud services can be customized to the screen size, display capability, or other functionality of the particular connected device (e.g., connected devices 1220A-N). For example, cloud services can be customized for mobile devices by taking into account the screen size, input devices, and communication bandwidth limitations typically associated with mobile devices.

V. Example Mobile Device

Figure 13:
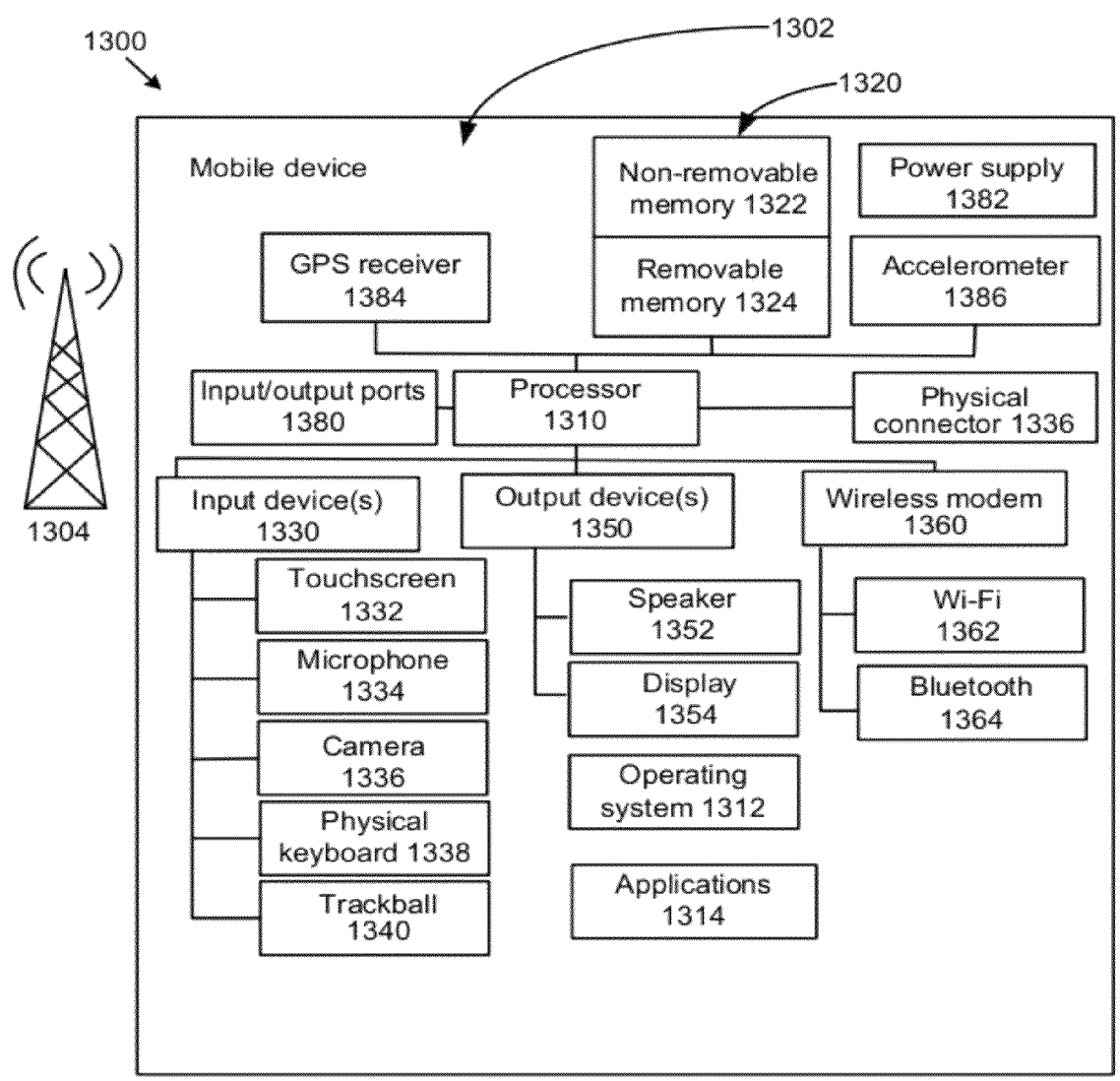
FIG. 13 is a block diagram of an exemplary mobile device suitable for implementing any of the technologies described herein.

FIG. 13 is a system diagram depicting an exemplary mobile device 1300 including a variety of optional hardware and software components, shown generally at 1302. Any components 1302 in the mobile device can communicate with any other component, although not all connections are shown, for ease of illustration. The mobile device can be any of a variety of computing devices (e.g., cell phone, smartphone, handheld computer, personal digital assistant (PDA), etc.) and can allow wireless two-way communications with one or more mobile communications networks 1304, such as a cellular or satellite network.

The illustrated mobile device can include a controller or processor 1310 (e.g., signal processor, microprocessor, ASIC, or other control and processing logic circuitry) for performing such tasks as signal coding, data processing, input/output processing, power control, and/or other functions. An operating system 1312 can control the allocation and usage of the components 1302 and support for one or more application programs 1314. The application programs can include common mobile computing applications (e.g., include email applications, calendars, contact managers, web browsers, messaging applications), or any other computing application.

The illustrated mobile device can include memory 1320. Memory 1320 can include non-removable memory 1322 and/or removable memory 1324. The non-removable memory 1322 can include RAM, ROM, flash memory, a disk drive, or other well-known memory storage technologies. The removable memory 1324 can include flash memory or a Subscriber Identity Module (SIM) card, which is well known in GSM communication systems, or other well-known memory storage technologies, such as smart cards. The memory 1320 can be used for storing data and/or code for running the operating system 1312 and the applications 1314. Example data can include web pages, text, images, sound files, video data, or other data sets to be sent to and/or received from one or more network servers or other mobile devices via one or more wired or wireless networks. The memory 1320 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device can support one or more input devices 1330, such as a touchscreen 1332, microphone 1334, camera 1336, physical keyboard 1338 and/or trackball 1340 and one or more output devices 1350, such as a speaker 1352 and a display 1354. Other possible output devices (not shown) can include a piezoelectric or other haptic output device. Some devices can serve more than one input/output function. For example, touchscreen 1332 and display 1354 can be combined in a single input/output device.

Touchscreen 1332 can accept input in different ways. For example, capacitive touchscreens can detect touch input when an object (e.g., a fingertip) distorts or interrupts an electrical current running across the surface. As another example, resistive touchscreens can detect touch input when a pressure from an object (e.g., a fingertip or stylus) causes a compression of the physical surface. As another example, touchscreens can use optical sensors to detect touch input when beams from the optical sensors are interrupted. Physical contact with the surface of the screen is not necessary for input to be detected by some touchscreens.

A wireless modem 1360 can be coupled to an antenna (not shown) and can support two-way communications between the processor 1310 and external devices, as is well understood in the art. The modem 1360 is shown generically and can include a cellular modem for communicating with the mobile communication network 1304 and/or other radio-based modems (e.g., Bluetooth or Wi-Fi). The wireless modem 1360 is typically configured for communication with one or more cellular networks, such as a GSM network for data and voice communications within a single cellular network, between cellular networks, or between the mobile device and a public switched telephone network (PSTN).

The mobile device can further include at least one input/output port 1380, a power supply 1382, a satellite navigation system receiver 1384, such as a global positioning system (GPS) receiver, an accelerometer 1386, a transceiver 1388 (for wirelessly transmitting analog or digital signals) and/or a physical connector 1390, which can be a USB port, IEEE 1394 (FireWire) port, and/or RS-232 port. The illustrated components 1302 are not required or all-inclusive, as components can be deleted and other components can be added.

VI. Extensions and Alternatives

This section documents some of the other extensions, alternatives and applications of the techniques and tools presented above.

Described linked burst mode image technology can be used in conjunction with other digital image processing technology. For example, described linked burst mode image technology can be used in a digital photo editing scenario to edit linked burst mode images on a computer. Photo editing can be performed, for example, on delta images or on root images.

Various alternatives to the examples described herein are possible. For example, techniques described with reference to flowchart diagrams can be altered by changing the ordering of stages shown in the flowcharts, by repeating or omitting certain stages, etc. As another example, although some examples are described with reference to specific digital media formats, other formats also can be used.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A computer-implemented method comprising:
   obtaining image data for plural images in a burst mode image series;
   calculating a difference between image data for a first image of the plural images in the burst mode image series and image data for a second image of the plural images in the burst mode image series; and
   storing delta image metadata and information representing the difference as an image file, wherein a set of one or more image metadata linker fields link the second image to the first image to facilitate reconstruction of the second image based on the information representing the difference and the image data for the first image, and wherein the set of one or more image metadata linker fields comprises a root image identifier field and an image index field comprising an index value representing an index in the burst mode image series for the second image relative to the first image.

2. The method of claim 1 further comprising:
   reconstructing the first image using information representing the image data for the first image; and
   reconstructing the second image based on the set of one or more image metadata linker fields, the information representing the difference, and the image data for the first image.

3. The method of claim 1 wherein the image file with the delta image metadata is a delta image file, the method further comprising:
   storing root image metadata and information representing the image data for the first image as a root image file separate from the delta image file.

4. The method of claim 3 wherein the root image file and the delta image file are EXIF files, wherein the information representing the difference is a compressed version of the difference, and wherein the information representing the image data for the first image is a compressed version of the image data for the first image.

5. The method of claim 3 wherein the root image metadata comprises a second set of one or more image metadata linker fields comprising:
   a root image identifier field;
   an image index field comprising an index value representing an index in the burst mode image series for the first image.

6. The method of claim 1 wherein the image file comprises embedded data, and wherein the embedded data facilitates reconstruction of the second image without referring to data in another image file.

7. The method of claim 1 wherein the difference between the image data for the first image and the image data for the second image comprises differences between plural quantized transform coefficients for the first image and plural quantized transform coefficients for the second image.

8. The method of claim 1 further comprising, before the storing the delta image metadata and the information representing the difference:
   comparing a difference measure for the difference with a threshold; and
   classifying the second image as a delta image based on the comparing.

9. The method of claim 8 further comprising:
   calculating a new difference between the image data for the second image and image data for a third image of the plural images in the burst mode image series;
   comparing a difference measure for the new difference with the threshold;
   classifying the third image as a delta image based on the comparing the difference measure for the new difference with the threshold; and
   storing information representing the new difference as a delta image file for the third image.

10. The method of claim 8 further comprising:
    calculating a new difference between the image data for the second image and image data for a third image of the plural images in the burst mode image series;
    comparing a difference measure for the new difference with the threshold;
    classifying the third image as a full image based on the comparing the difference measure for the new difference with the threshold; and
    storing information representing the image data for the third image as a full image file.

11. The method of claim 1 wherein the first image is earlier in time than the second image.

12. The method of claim 1 wherein the first image is later in time than the second image.

13. The method of claim 1 wherein the obtaining comprises capturing the image data for each of the plural images in the burst mode image series.

14. The method of claim 1 further comprising, after the obtaining, for each of the plural images in the burst mode image series:
    performing a forward frequency transform on image data for the image to produce transform coefficients for the image; and
    quantizing the transform coefficients for the image;
    wherein the calculating the difference is performed after the quantizing between the quantized transform coefficients for the first and second images, respectively.

15. One or more computer-readable storage devices having stored thereon a data structure comprising metadata for one or more images in a burst mode image series, the data structure comprising:
    an image format identifier field comprising an identifier of a linked burst mode image format;
    a root image identifier field comprising an identifier of a root image for the burst mode image series; and
    an image index field comprising an index value representing an index of a given image in the burst mode image series.

16. The computer-readable storage devices of claim 15 wherein the data structure further comprises a full image field comprising a bit that indicates whether the given image is a full image or a delta image.

17. The computer-readable storage devices of claim 15 wherein the image index field indicates that the given image is the root image, and wherein the data structure further comprises one or more embedded data fields.

18. The computer-readable storage devices of claim 15 wherein the image index field indicates that the given image is the root image, and wherein the data structure further comprises:
    a start index field comprising a start index value representing a starting index for the burst mode image series; and
    an end index field comprising an end index value representing an ending index for the burst mode image series.

19. The computer-readable storage devices of claim 18 wherein the starting index for the burst mode image series corresponds to an image that is earlier in time relative to the root image, and wherein the ending index for the burst mode image series corresponds to an image that is later in time relative to the root image.

20. A computing device comprising one or more processors, an image capture device, a display, and one or more computer readable storage media having stored therein computer-executable instructions for performing a method comprising:
with the image capture device, capturing image data for each of plural images in a burst mode image series;
classifying a first image of the plural images in the burst mode image series as a root image;
calculating a difference between the first image and a second image of the plural images in the burst mode image series;
classifying the second image as a delta image based on the difference;
storing root image metadata and information representing the image data for the first image as a root image file, the root image metadata comprising a first set of one or more image metadata linker fields;
storing delta image metadata and information representing the difference, the delta image metadata comprising a second set of one or more image metadata linker fields that link the second image to the first image; and
displaying an indicator of the burst mode image series in a library view on the display, the indicator comprising a thumbnail version of the root image.

21. At least one computer-readable memory storing computer-executable instructions for performing a method, the method comprising:
obtaining image data for plural images in a burst mode image series;
calculating a difference between image data for a first image of the plural images in the burst mode image series and image data for a second image of the plural images in the burst mode image series; and
storing delta image metadata and information representing the difference as a delta image file, wherein a set of one or more image metadata linker fields link the second image to the first image to facilitate reconstruction of the second image based on the information representing the difference and the image data for the first image; and
storing root image metadata and information representing the image data for the first image as a root image file separate from the delta image file.

22. The at least one computer-readable memory of claim 21 wherein the root image file and the delta image file are EXIF files, wherein the information representing the difference is a compressed version of the difference, and wherein the information representing the image data for the first image is a compressed version of the image data for the first image.

23. The at least one computer-readable memory of claim 21 wherein the root image metadata comprises a second set of one or more image metadata linker fields comprising:
a root image identifier field;
an image index field comprising an index value representing an index in the burst mode image series for the first image.

24. The at least one computer-readable memory of claim 21 wherein the difference between the image data for the first image and the image data for the second image comprises differences between pixel values of the first image and pixel values of the second image.

25. The at least one computer-readable memory of claim 21 wherein the difference between the image data for the first image and the image data for the second image comprises differences between plural quantized transform coefficients for the first image and plural quantized transform coefficients for the second image.

26. At least one computer-readable memory storing instructions for performing a method, the method comprising:
obtaining image data for plural images in a burst mode image series;
calculating a difference between image data for a first image of the plural images in the burst mode image series and image data for a second image of the plural images in the burst mode image series;
comparing a difference measure for the difference with a threshold;
classifying the second image as a delta image based on the comparing; and
storing delta image metadata and information representing the difference as an image file, wherein a set of one or more image metadata linker fields link the second image to the first image to facilitate reconstruction of the second image based on the information representing the difference and the image data for the first image.

27. The at least one computer-readable memory of claim 26, wherein the method further comprises:
calculating a new difference between the image data for the second image and image data for a third image of the plural images in the burst mode image series;
comparing a difference measure for the new difference with the threshold;
classifying the third image as a delta image based on the comparing the difference measure for the new difference with the threshold; and
storing information representing the new difference as a delta image file for the third image.

28. The at least one computer-readable memory of claim 26, wherein the method further comprises:
calculating a new difference between the image data for the second image and image data for a third image of the plural images in the burst mode image series;
comparing a difference measure for the new difference with the threshold;
classifying the third image as a full image based on the comparing the difference measure for the new difference with the threshold; and
storing information representing the image data for the third image as a full image file.

29. The at least one computer-readable memory of claim 26, wherein the image file with the delta image metadata is a delta image file, the method further comprising:
storing root image metadata and information representing the image data for the first image as a root image file separate from the delta image file.

30. The at least one computer-readable memory of claim 29, wherein the root image file and the delta image file are EXIF files, wherein the information representing the difference is a compressed version of the difference, and wherein the information representing the image data for the first image is a compressed version of the image data for the first image.

31. The at least one computer-readable memory of claim 26, wherein the set of one or more image metadata linker fields comprises:
a root image identifier field; and
an image index field comprising an index value representing an index in the burst mode image series for the second image relative to the first image.

32. A computer-implemented method comprising:
   obtaining image data for plural images in a burst mode image series;
   for a first image and a second image of the plural images:
      performing a forward frequency transform on image data for the respective image to produce transform coefficients for the respective image; and
      quantizing the transform coefficients for the respective image;
   calculating a difference between the quantized transform coefficients of the first image and the second image; and
   storing delta image metadata and information representing the difference as an image file, wherein a set of one or more image metadata linker fields link the second image to the first image to facilitate reconstruction of the second image based on the information representing the difference and the image data for the first image.

33. The method of claim 32, wherein the set of one or more image metadata linker fields comprises:
   a root image identifier field; and
   an image index field comprising an index value representing an index in the burst mode image series for the second image relative to the first image.

34. The method of claim 32 wherein the image file with the delta image metadata is a delta image file, the method further comprising:
   storing root image metadata and information representing the image data for the first image as a root image file separate from the delta image file.

35. The method of claim 34 wherein the root image file and the delta image file are EXIF files, wherein the information representing the difference is a compressed version of the difference, and wherein the information representing the image data for the first image is a compressed version of the image data for the first image.

36. The method of claim 34 wherein the root image metadata comprises a second set of one or more image metadata linker fields comprising:
   a root image identifier field;
   an image index field comprising an index value representing an index in the burst mode image series for the first image.

37. At least one computer-readable memory storing instructions for performing a method, the method comprising:
   reconstructing a first image of a burst mode series using information representing image data for the first image; and
   reconstructing a second image of the burst mode series based on:
      (a) a set of one or more image metadata linker fields that link the second image to the first image, the set of one or more image metadata linker fields comprising (i) a root image identifier field, and (ii) an image index field comprising an index value representing an index in the burst mode image series for the second image relative to the first image;
      (b) information representing a difference between the image data for the first image and the image data for the second image, and
      (c) the image data for the first image;
   wherein an image file stores delta image metadata and the information representing the difference.

38. The at least one computer-readable memory of claim 37 wherein the image file comprises embedded data, and wherein the embedded data facilitates reconstruction of the second image without referring to data in another image file.

* * * * *